Aug. 3, 1948.                F. J. VAN DUSEN                2,446,445
                          SHOCK RESISTING RETAINER
                            Filed Feb. 27, 1945
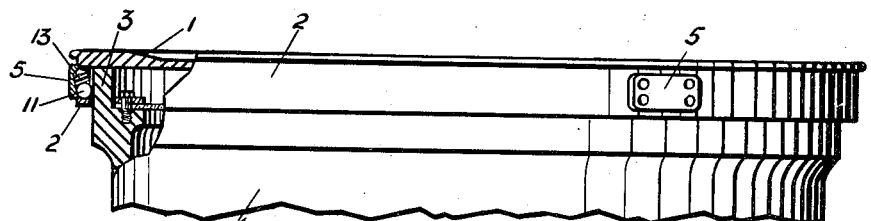
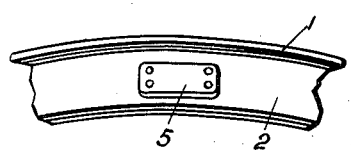
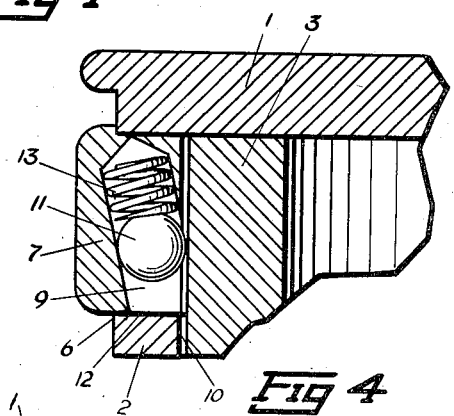
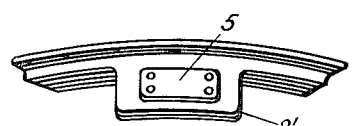
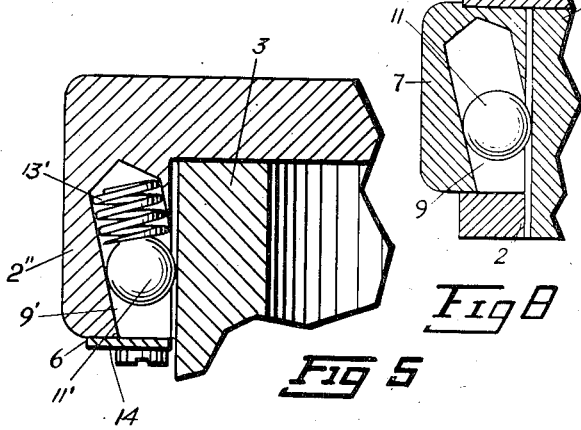
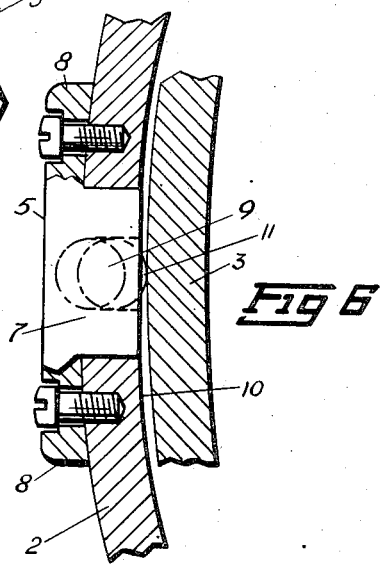
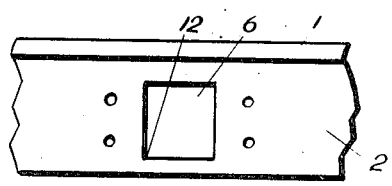
INVENTOR.
Frederick J. Van Dusen
BY
Ralph L Chappell
ATTORNEY Patented Aug. 3, 1948

2,446,445

UNITED STATES PATENT OFFICE 2,446,445

SHOCK RESISTING RETAINER

Frederick J. Van Dusen, Jackson Heights, N. Y.

Application February 27, 1945, Serial No. 580,052

8 Claims. (Cl. 188—67)

(Granted under the act of March 3, 1883, as amended April 30, 1928; 370 O. G. 757)

This invention relates in general to retaining devices and in particular to a shock-resisting retainer for detachable seat-mounted members such as azimuth and bearing circles, telescopic alidades and the like.

It has been found under actual operating conditions where sudden and violent shocks, such as gun fire, explosions, etc., are encountered, that the azimuth or bearing circle or other seat-mounted members would be lifted from the seat and separated from the base, dropping to the deck with consequent total loss or damage preventing use until repair facilities are available.

In the normal use of an azimuth or bearing circle it is necessary that it be rotatable easily and also removable readily from its seat for cleaning, adjustment, stowage or use on another instrument.

It is one object of my invention to provide in detachable seat-mounted devices, retainer means constructed and arranged to act as a brake when the mounted device is subjected to sudden shocks or rapid withdrawing motion, the brake action being eliminated when a slow withdrawing movement is employed.

Another object is to provide, in detachable seat-mounted devices such as an azimuth or bearing circle or similar devices, means to render the circle rotatable freely on its seat, removable easily and quickly by a slow rotary withdrawing movement, but non-removable by sudden shocks or withdrawing force.

A further object is to provide, in detachable seat-mounted members, means for centering the member on its seat.

Other objects and advantages of my invention will be apparent by reference to the following description in connection with the accompanying drawing, in which Fig. 1 is an elevational view of an azimuth or bearing circle and the upper portion of a compass head, parts being shown in section;

Fig. 2 is a fragmentary perspective view of a bearing or azimuth circle with a retainer insert;

Fig. 3 is a similar view of a modification showing lugs for receiving the retainer;

Fig. 4 is an enlarged fragmentary sectional view of the azimuth circle and retainer assembly;

Fig. 5 is a similar view of a modification employing the principles of my invention without the use of an insert;

Fig. 6 is a top view of one of the retainer inserts, parts being shown in section;

Fig. 7 is a fragmentary elevational view of a portion of the azimuth or bearing circle showing the opening provided for insertion of the shock resisting retainer; and Figure 8 is a fragmentary sectional view of a modification of my invention as shown in Figure 1.

I have shown my invention in the form of an attachment or modification to existing azimuth or bearing circles. However, the principles of the invention can be incorporated in construction of new circles and similar devices with slight changes in form.

An azimuth or bearing circle with depending annular flange 2 is seated on bezel ring 3 of compass or gyro repeater head 4, a fragmentary portion of which is shown.

Retainer inserts 5 are positioned in openings 6 of flange 2. In actual practice it has been found that three retainers 120° apart are sufficient to accomplish their intended purpose. However, I do not wish to be limited to the use of three retainers, as it is likely that on large rings more than three may be necessary and in some cases two opposite inserts with two opposing adjustable contacts, or a single insert, can be employed.

The retainer 5 comprises a block 7 and fastening lugs 8 by means of which the retainer is secured to the flange 2.

The block 7 is provided with a circular recess 9 extending upward angularly from the bottom of the block 7 and outward from the center of the circle 1 when assembled. A ball 11 is positioned in the recess 9 and is urged normally downwardly against bottom edge 12 of opening 6 and against bezel ring 3 by spring 13.

As will be seen in Fig. 4, the recess 9 is so arranged that the ball 11 extends slightly past the inner edge 10 of the flange 2 when it is in its lowest position. This position, however, will vary with the diameter of the ring 3 on the instrument on which the removable circle is mounted. The ball is urged normally against the ring 3 due to the action of the spring 13. I have found it preferable to form the recess 9 at an angle of 77° but do not wish to be limited to this precise angle.

When the circle is subjected to sudden shocks or a rapid upward withdrawing movement, the balls 11 act as a brake by exerting increased pressure against the ring 3 through the action of the spring 13 and the angle of the recess 9 in which the ball rides.

A slow upward and turning movement of the circle makes the brake action negligible or eliminated and the circle can be removed easily. The balls create virtually no friction when it is necessary to rotate the circle in its manipulation. On the other hand, it has been found that they permit easier rotation of the circle than is possible in the present circle, which has no ball bearings but provides several adjustable point contacts.

In practice with present devices, the operators usually back off the adjustable contacts so that the circle can turn very freely—consequently, the slightest shock will unseat the circle. Also, considerable play is encountered during its manipulation.

In a modification of my invention, the spring 13 is omitted and the gravitation of the ball 11 is depended on to retain it in contact with the ring 3. This modification is illustrated in Figure 8. It will be understood that omission of the spring in other modifications, such as that shown in Figure 5, is within the scope of this invention.

In another modification shown in Fig. 3, spaced depending lugs 2' are employed instead of flange 2 and inserts 5 are applied to each lug.

A further modification illustrated in Fig. 5 indicates an application omitting the use of inserts. The depending flange or lug 2'' is provided with a recess 9' in which ball 11' and spring 13' are positioned. A ball-retaining plate 14 is secured to the lower edge of flange or lug 2'' to keep the ball in the recess.

From the foregoing it will be apparent that I have provided a simple, inexpensive, shock resisting retainer for detachable seat-mounted devices including azimuth circles and similar ring devices wherein the requirement of ease in rapid detachment is retained but the seated member remains centered and impervious to sudden and violent shocks that normally unseat the present circles in use.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A shock-resisting detachable mounting for seat-supported devices including a support and a supported member detachable therefrom, one or more spaced bores in the supported member, said bores being inclined upwardly and away from the supporting member, a support-contacting member positioned in each of the bores and adapted to normally bear against the supporting member whereby a braking action is effected between the contacting members and the supporting member when the supported member is subjected to violent shocks or rapid withdrawing motion, and the braking action is eliminated when the supported member is slowly withdrawn from the support.

2. The structure as specified in claim 1, including a spring in each of the bores normally urging the support-contacting member against the support.

3. A shock-resisting detachable mounting for seat-supported devices including a support with a peripheral upstanding flange and a supported member with a depending flange, one or more spaced bores in the depending flange, said bores being inclined upwardly and away from the upstanding flange, a gravitating brake member positioned in each of the recesses and adapted to normally bear against the upstanding flange, whereby a braking action is effected between the brake members and the support when the supported member is subjected to violent shocks or rapid withdrawing motion, and the braking action is eliminated when the supported member is slowly withdrawn from its support.

4. A shock resisting detachable mounting for seat-supported devices including a support and a supported member detachable therefrom, a plurality of spaced bores in the supported member, said bores being inclined upwardly and away from the supporting member, a ball-bearing in each of the recesses, resilient means for urging the ball-bearings against the support, a rapid upward movement of the supported member causing increased downward and inward pressure of the ball bearings against the support to prevent separation of the supported member from the support, and a slow upward rotary movement of the supported member decreasing pressure of the ball-bearings against the support and permitting withdrawal of the supported member.

5. A shock-resisting detachable mounting for seat-supported devices including a support and a supported member, one or more openings in the supported member, retainer inserts receivable in the openings, a bore in each of the inserts extending upwardly and outwardly from the support, brake members in each of the bores normally bearing against the bottom of the opening and adapted to contact the support, whereby a braking action is effected between the brake members and the support when the supported member is subjected to violent shocks or rapid withdrawing motion, and the braking action is eliminated when the supported member is slowly withdrawn from the support.

6. A shock-resisting detachable mounting for seat-supported devices including a support and a supported member, one or more openings in the supported member, retainer inserts receivable in the openings, a bore in each of the inserts extending upwardly and outwardly from the support, brake members in each of the bores normally bearing against the bottom of the opening and adapted to contact the support, springs in each of the recesses urging the brake members downwardly against the bottom of the opening and the support whereby a braking action is effected between the brake members and the support when the supported member is subjected to violent shocks or rapid withdrawing motion, and the braking action is eliminated when the supported member is slowly withdrawn from the support.

7. A shock-resisting detachable mounting for seat-supported devices including a support having an annular upstanding flange, and a supported member having an annular depending flange, a plurality of spaced bores about the depending flange, said bores being inclined upwardly and away from the upstanding flange, a ball bearing in each of the bores adapted to provide bearing members for easy rotation of the supported member, means for urging the ball bearings against the upstanding flange to act as brake members, a rapid upward movement of the supported member causing increased pressure downward and against the upstanding support flange whereby separation of the supported member from the support is prevented, and a slow upward rotary movement of the supported member preventing an increase of pressure of the ball bearings against the upstanding support flange whereby the supported member may be withdrawn from the support.

8. A shock-resisting detachable mounting for seat-supported devices including a support having an annular upstanding flange, and a supported member having a plurality of spaced depending members, a bore in each of the depending members, said bores being inclined upwardly and away from the upstanding flange, a ball bearing in each of the bores adapted to provide bearing members for easy rotation of the supported member, means for urging the ball bearings against the upstanding flange, a rapid upward movement of the supported member causing increased pressure downward and against the upstanding support flange whereby separation of the supported member from the support is prevented, and a slow upward rotary movement of the supported member preventing an increase of pressure of the ball bearings against the upstanding support flange whereby the supported member may be withdrawn from the support.

FREDERICK J. VAN DUSEN.

REFERENCES CITED

The following references are of record in the file of this patent:

UNITED STATES PATENTS

| Number    | Name     | Date          |
|-----------|----------|---------------|
| 2,139,666 | Bogart   | Dec. 13, 1938 |
| 2,348,611 | Davidson | May 9, 1944   |
| 2,392,308 | Brown    | Jan. 8, 1946  |
| 2,410,243 | Schultz  | Oct. 29, 1946 |